J. F. MILLS.
AUTOMOBILE LOCK.
APPLICATION FILED APR. 17, 1919. RENEWED APR. 26, 1921.

1,392,194. Patented Sept. 27, 1921.

WITNESSES:
Thos. W. Riley

INVENTOR.
J. F. Mills
BY W. J. Fitz Gerald & Co.
ATTORNEYS.

UNITED STATES PATENT OFFICE.

JAMES FRANKLIN MILLS, OF UVALDA, GEORGIA.

AUTOMOBILE-LOCK.

1,392,194.  Specification of Letters Patent.  Patented Sept. 27, 1921.

Application filed April 17, 1919, Serial No. 290,730. Renewed April 26, 1921. Serial No. 464,537.

*To all whom it may concern:*

Be it known that I, JAMES F. MILLS, a citizen of the United States, residing at Uvalda, in the county of Montgomery and State of Georgia, have invented certain new and useful Improvements in Automobile-Locks; and I do hereby declare the following to be a full, clear, and exact description of the invention, such as will enable others skilled in the art to which it appertains to make and use the same.

The present invention relates to automobile locks and aims to provide a novel and improved, yet extremely simple and inexpensive device for locking an automobile to prevent the unwarranted operation thereof for purpose of theft or otherwise.

The object of the invention is the provision of a device embodying two pivotally connected arms of novel form adapted to swing together and embrace a set of levers controlling the operation of a Ford or similar automobile, whereby it is impossible for a person not possessing the required key, to unlock the machine or operate it, said arms when locked together holding the brake, clutch pedal and reverse pedal levers in a certain position which will prevent operation of the machine until the levers are unlocked and released.

With the foregoing and other objects in view which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein:—

Figures 1, 2:
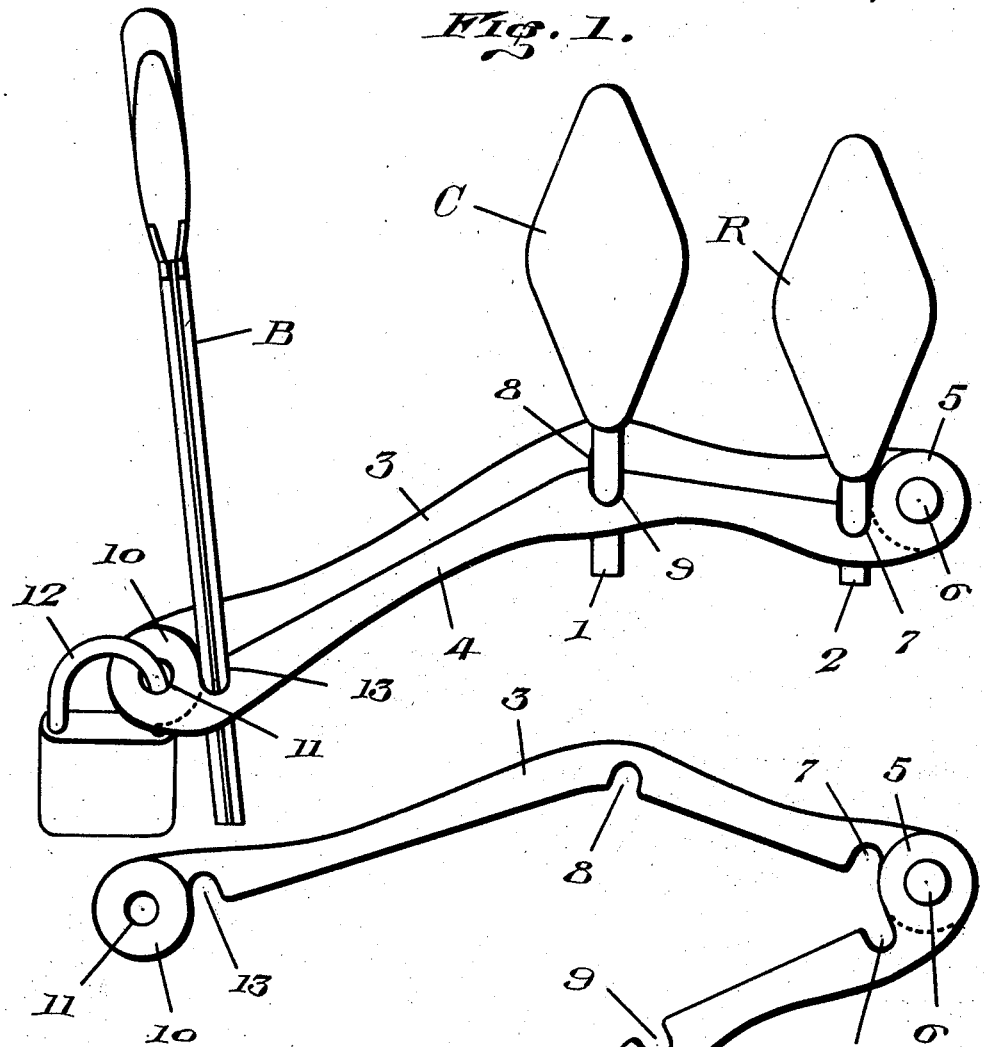
Figure 1 is a plan view of the device as applied to the controlling levers of a Ford or similar automobile.
Fig. 2 is a plan view of the device in open position.

In Fig. 1 there is shown the emergency brake lever B, clutch pedal C carried by the lever 1, and the reverse pedal R mounted on the lever 2. The present locking device is designed to be applied to the levers, and comprises a pair of arms 3 and 4, each of angular form and adapted to fit snugly together side by side with the elbow of the arm 4 fitting within the angle of the elbow of the arm 3, as seen in Fig. 1. Each of the arms is provided at one end with an ear or hinge butts 5, and said hinge butts of the two arms overlap and are pivotally connected by means of a rivet 6 or the like. The adjacent sides of said arms are provided immediately adjacent to the end butts 5 with notches or recesses 7. These notches 7 are for the purpose of receiving the reverse pedal lever 2 so that the arms embrace said lever adjacent to the pivot or hinge.

The arm 3 is provided with a notch 8 at the inner side of its elbow or angle, while the arm 4 is provided with a complementary notch or recess 9 at the corner of its elbow or angle, in order that said notches or recesses 8 and 9 will accommodate and embrace the clutch pedal lever 1.

The arms are provided at their free ends with the ears 10 projecting toward one another so as to overlap when the arms are swung together, and said ears have the apertures 11 for receiving a padlock 12. The adjacent sides of the arms are provided immediately adjacent to the ears 10 with notches or recesses 13 to receive the brake lever B and cause the arms to embrace the same.

In using the device to lock the automobile, the clutch pedal is moved backwardly so as to open the clutch, and the lever B is moved forwardly into high speed position, while the reverse pedal is pushed forwardly into reverse position, so that when the levers are locked in these positions, the car can not be operated. The arms 3 and 4 are then placed in front and in back, respectively, of the levers and swung together, and due to the shape of the arms and the provision of the notches in the adjacent sides thereof as above described, said arms when swung together will embrace the levers, as seen in Fig. 1, and then by applying a padlock 12 to the ears 10, the arms will be locked together, and will prevent the movement of any of the levers for operating the car, it being noted that the intermediate lever 1 is in its rearmost position while the levers 2 and B are in their foremost positions, thereby preventing any of the levers being swung as long as the device is applied.

Having thus described the invention, what is claimed as new is:—

An automobile locking device for retaining a brake, and high speed lever in forward high speed position, a reverse pedal lever in forward reverse position and a clutch pedal lever in rear open position, comprising a pair of arms each being of obtuse angled form, one arm to extend across said levers in front thereof and the other to extend across the levers in rear thereof, said arms being adapted to fit snugly together, the rear arm within the angle of the forward arm, each arm being provided with ears at its opposite ends extending toward the other arm, a pivot connecting the ears at one end in overlapping relation, the ears at the other end being apertured, and a padlock to engage through the last named ears, the adjacent sides of the arms having complementary notches immediately adjacent to said ears for receiving the brake and high speed lever and reverse pedal lever with the ears adjacent to said levers, the forward arm having a recess at the angle thereof, and the rear arm having a complementary recess at the elbow thereof for receiving the clutch pedal lever.

In testimony whereof I have signed my name to this specification in the presence of two subscribing witnesses.

JAMES FRANKLIN MILLS.

Witnesses:
C. R. BAGGOT,
J. J. MOSES.